US009483951B1

(12) United States Patent
McCusker

(10) Patent No.: US 9,483,951 B1
(45) Date of Patent: Nov. 1, 2016

(54) AIRBORNE SYSTEM AND METHOD FOR DETECTING AND AVOIDING ATMOSPHERIC PARTICULATES

(71) Applicant: Rockwell Collins, Inc., Cedar Rapids, IA (US)

(72) Inventor: Patrick D. McCusker, Walker, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 311 days.

(21) Appl. No.: 14/306,616

(22) Filed: Jun. 17, 2014

(51) Int. Cl.
 *G08G 5/00* (2006.01)
 *G08B 19/02* (2006.01)
(52) U.S. Cl.
 CPC .............. *G08G 5/0091* (2013.01); *G08B 19/02* (2013.01)
(58) Field of Classification Search
 CPC ....... G08G 5/0091; G08B 19/02; G01J 5/60; H04N 5/33; H04N 5/332
 See application file for complete search history.

(56) References Cited

U.S. PATENT DOCUMENTS

| | | | | |
|---|---|---|---|---|
| 5,602,543 A | * | 2/1997 | Prata et al. ............... | G01J 5/60 250/338.5 |
| 5,654,700 A | * | 8/1997 | Prata et al. ............... | G01J 5/60 250/339.14 |
| 7,383,131 B1 | | 6/2008 | Wey et al. | |
| 8,159,369 B1 | * | 4/2012 | Koenigs et al. ........ | G01S 7/062 340/963 |
| 8,957,373 B1 | | 2/2015 | Tiana et al. | |
| 2012/0191350 A1 | | 7/2012 | Prata et al. | |
| 2013/0135470 A1 | | 5/2013 | Prata et al. | |

OTHER PUBLICATIONS

Unpublished U.S. Appl. No. 13/247,691, filed on Sep. 28, 2011, and titled "Spectrally Enhanced Vision System for Low Visibility Operations".
Unpublished U.S. Appl. No. 13/864,991, filed on Apr. 17, 2013, and titled "Vision System and Method Having Improved Performance and Solar Mitigation" .
Prata, A. J., 2009, Satellite detection of hazardous volcanic clouds and the risk to global air traffic, Nat. Haz., 51, 303-324.
Prata, F., Volcanic Ash and Volcanic Gases: Effects on Aviation, ESA Workshop presentation, May 27, 2010.

* cited by examiner

*Primary Examiner* — James Yang
(74) *Attorney, Agent, or Firm* — Angel N. Gerdzhikov; Donna P. Suchy; Daniel M. Barbieri

(57) ABSTRACT

An airborne system for detecting and avoiding atmospheric particulates, which include a sensor coupled with an aircraft and configured to capture electromagnetic signals from a flight path of the aircraft, including infrared wavelengths, an output device configured to provide visual and an aural messages to a flight crew, and a processor coupled with sensor, the output device, and a non-transitory processor-readable medium storing processor-executable instructions for causing the processor to: receive a signal from the sensor via an input port; calculate a temperature difference between a first and second infrared wavelengths; determine a presence of atmospheric particulates in the flight path based on the temperature difference; generate an aural message and/or a visual message indicative of the presence of atmospheric particulates; and provide the message to a flight crew. The processor may calculate an alternate flight path and provide the alternate flight path to the flight crew.

17 Claims, 5 Drawing Sheets

AIRBORNE SYSTEM AND METHOD FOR DETECTING AND AVOIDING ATMOSPHERIC PARTICULATES

BACKGROUND

Embodiments of the inventive concepts disclosed herein are generally directed to airborne systems and methods for detecting and avoiding atmospheric particulates, and more particularly, but not by way of limitation, to airborne systems and methods for detecting and avoiding volcanic ash, ice crystals, and other atmospheric particulates in a flight path of an aircraft.

Atmospheric particulates such as volcanic ash plumes or clouds, ice crystals, smoke, dust, or other particulates suspended, dispersed, aerosolized, or otherwise present in the atmosphere occur naturally, typically originating from volcano eruptions, dust storms, forest and grassland fires, vegetation, erosion, sandstorms, tornadoes, or other natural sources. Examples of human activities which are sources of atmospheric particulates include the burning of fossil fuels in vehicles and power plants, various industrial and agricultural processes, controlled burns, and space vehicle launches.

Atmospheric particulates represent significant hazards to continued safe operation of aircraft when such atmospheric particulates are present in the aircraft's flight path and are encountered by the aircraft. In some cases, atmospheric particulates such as volcanic ash encountered by an aircraft during flight may enter the engines or avionic systems of the aircraft and may cause damage, extensive wear, and in some cases may even lead to complete engine shutdown, inoperable avionic systems, or other malfunctions resulting in flight emergencies and increased operation and maintenance costs.

Volcanic eruptions are the main source of atmospheric sulfur dioxide ($SO_2$, a toxic gas with a pungent rotten odor). Accordingly, the presence of increased $SO_2$ concentrations may be correlated with or interpreted as an indication of the potential presence of volcanic ash in the vicinity of the area with increased $SO_2$ concentrations. However, because $SO_2$ and volcanic ash disperse differently in the atmosphere and are not always co-located after a volcano eruption, increased atmospheric $SO_2$ concentrations are typically combined with other factors (e.g., visual observation, reported sightings of ash plumes, known volcano locations or eruptions, lightning strikes, satellite imagery) to evaluate the presence of volcanic ash. In the past, increased $SO_2$ concentrations were generally detected by flight crews by smell, i.e., after the aircraft had already encountered the increased $SO_2$ concentration.

As another example, ice crystals encountered during flight may stick to, coat, or otherwise accumulate onto aircraft control surfaces or avionic system sensors or ports and may cause a variety of problems including compromised flight characteristics or inaccurate avionic system readings or complete system failures.

To ensure aircraft safety, currently applicable International Civil Aviation Organization (ICAO) rules specify that pilots avoid flying into visible clouds of volcanic ash. Further, while some aircraft are equipped with heaters and other devices allowing aircraft to fly into know ice, most aircraft avoid flying into known accumulations of ice crystals.

While higher density clouds, plumes, or accumulations of volcanic ash or other atmospheric particulates are generally visible to flight crews during clear weather and daylight conditions, even higher density clouds of atmospheric particulates may not be easily visible or may be practically visually undetectable during night, low light, inclement weather, or other reduced or compromised visibility conditions. Further, lower-density atmospheric particulates which are practically invisible even under optimal visibility conditions present significant dangers to continued safe operations of aircraft, because damage caused by atmospheric particulates is cumulative and is a function of the total mass or total mass load of atmospheric particulates encountered by the aircraft. The total mass of atmospheric particulates encountered by the aircraft depends on both the density and the total area of the encountered atmospheric particles. For example, relatively low-density clouds or other accumulations of atmospheric particles encountered over a relatively larger portion of the flight path of an aircraft may cause the same or similar damage to the aircraft as relatively high-density clouds or other accumulations atmospheric particles encountered over a relatively smaller portion of the flight path.

To enhance aircraft safety and reduce the likelihood of aircraft encountering atmospheric particulates, satellite imaging has been used to detect volcanic ash with limited success due to inherent limitations which make satellite imaging impractical for this purpose. For example, because satellite imaging is top-down imaging, satellite imaging is significantly hindered or rendered impossible by interferences from meteorological clouds which may obscure or conceal atmospheric particulates from the vantage point of the satellite. Further, there is no feasible way to accurately measure the vertical dimension (e.g., the height) of atmospheric particulates via satellite imaging due to the top-down vantage point of the satellite relative to the atmospheric particulates.

Another issue that limits the use of satellite imaging for detection of atmospheric particulates is that satellite imaging data is typically transmitted to a control center, which then processes and interprets the imaging data to determine the presence and location of atmospheric particulates. Various algorithms use satellite imagery and a variety of parameters which are integrated over the area covered by the atmospheric particulates to infer the total mass and mass loading of a particular cloud or accumulation of atmospheric particulates. The total mass and the mass loading are quantifiable products of the analysis and are integrated with various atmospheric particulates dispersion models to generate risk maps for use by the aviation industry.

Once this processing is complete, the control center relays the risk maps and other relevant information to aircraft in the vicinity of the detected atmospheric particulates, which introduces a delay between the time the satellite imagery was initially obtained and the time the atmospheric particulate information is provided to flight crews. This inherent delay may cause an aircraft to encounter atmospheric particulates prior to the information being relayed to the aircraft, or because connectivity with the control center is intermittent or lost. Further, as atmospheric particulates often move or disperse due to winds in the atmosphere, this delay may result in inaccurate information being relayed to the aircraft as atmospheric particulates may have moved, dispersed, and/or the density, total mass, or mass loading of the atmospheric particulates may have changed since the satellite imaging data was originally captured. The inaccurate information may cause aircraft flight paths to be unnecessarily altered, resulting in increased operating expenses, or may result in the aircraft unexpectedly encountering atmospheric particulates which have moved beyond the reported or expected position or location.

Accordingly, it would be advantageous to provide aircraft with an airborne system configured to detect atmospheric particulates in the flight path of the aircraft, determine the hazard level of the atmospheric particulates, alert flight crews of the potential encounter, and assist flight crews in avoiding the atmospheric particulates by altering the flight path of the aircraft as appropriate. It is to such system and methods of using thereof that embodiments of the inventive concepts disclosed herein are directed.

SUMMARY

In one aspect, the inventive concepts disclosed herein are directed to an airborne system for detecting atmospheric particulates. The system includes a sensor coupled with an aircraft and configured to capture electromagnetic signals from a flight path of the aircraft. The electromagnetic signals may include a first infrared wavelength and a second infrared wavelength different from the first infrared wavelength. An output device is configured to provide an image, a visual message, and/or an aural message in a form perceivable by a flight crew member. A processor is coupled with the at least one sensor, the output device, and with a non-transitory processor-readable medium. The non-transitory processor-readable medium stores processor-executable instructions for causing the processor to: (1) receive a signal from the sensor indicative of an electromagnetic signal via an input port; (2) calculate a temperature difference between the first infrared wavelength and the second infrared wavelength; (3) determine a presence of atmospheric particulates in the flight path of the aircraft based on the temperature difference; (4) generate an aural message and/or a visual message indicative of the presence of atmospheric particulates in the flight path of the aircraft; and (5) provide the aural message and/or the visual message to a flight crew via the output device.

In some embodiments, the non-transitory processor-readable medium may also store processor-executable instructions for causing the processor to: (a) determine a density and a width component of the atmospheric particulates in the flight path of the aircraft based at least partially on the temperature difference; (b) calculate a total mass load of the atmospheric particulates based on the density and the width component; and (c) determine an associated hazard level of the atmospheric particulates based on the total mass load of the atmospheric particulates. The aural message and/or the visual message may include an advisory, a caution, and/or a warning indicative of the associated hazard level of the atmospheric particulates.

In some embodiments, the non-transitory processor-readable medium may also store processor-executable instructions for causing the processor to generate an image of the atmospheric particulates in the flight path of the aircraft, the image indicative of the total mass load of the atmospheric particulates, and provide the image to the flight crew via the output device.

The aural message and/or the visual message may be provided to the flight crew via a crew alerting system configured to prioritize a plurality of images, visual, and aural messages including the aural message and/or the visual message.

In some embodiments, the first infrared wavelength may be about 10.8 um and the second infrared wavelength may be about 12 um, the atmospheric particulates include volcanic ash, and the non-transitory processor-readable medium may further store processor-executable instructions for causing the processor to: (1) calculate a temperature difference between the second infrared wavelength and the first infrared wavelength; (2) determine a presence of ice crystals in the flight path of the aircraft and an associated hazard level based on the temperature difference between the second infrared wavelength and the first infrared wavelength; (3) generate an advisory, a caution, and/or a warning indicative of the presence of ice crystals in the flight path of the aircraft and/or the associated hazard level; and (4) provide the advisory, the caution, and/or the warning to the flight crew via the output device.

In some embodiments, the electromagnetic signal may include a third infrared wavelength of about 8.7 um, and the non-transitory processor-readable medium may further store processor-executable instructions for causing the processor to: (1) determine a presence of $SO_2$ gas in the flight path of the aircraft based on the third infrared wavelength; (2) generate an advisory, a caution, and/or a warning indicative of a presence of volcanic ash in the flight path of the aircraft based at least partially on the presence of $SO_2$ gas; and (3) provide the advisory, the caution, and/or the warning to the flight crew via the output device.

In a further aspect, the inventive concepts disclosed herein are directed to an airborne system for detecting atmospheric particulates. The system includes at least two sensors coupled with an aircraft and configured to capture electromagnetic signals from a flight path of the aircraft. The sensors include a first sensor configured to capture a first signal having a first infrared wavelength and a second sensor configured to capture a second signal having a second infrared wavelength different from the first infrared wavelength. An output device is configured to provide at least one of: an image, a visual message, and an aural message in a form perceivable by a flight crew. A processor is coupled with the sensors, the output device, and with a non-transitory processor-readable medium. The non-transitory processor-readable medium stores processor-executable instructions for causing the processor to: (1) receive a signal from each of the at least two sensors indicative of at least the first infrared signal and the second infrared signal via an input port; (2) calculate a temperature difference between the first wavelength and the second wavelength; (3) determine a presence of atmospheric particulates in the flight path of the aircraft based on the temperature difference; (4) generate an audio message and/or a visual message indicative of the presence of atmospheric particulates in the flight path of the aircraft; and (5) provide the aural message and/or the visual message to a flight crew via the output device.

In some embodiments, the non-transitory processor-readable medium further stores processor-executable instructions for causing the processor to: determine a density and a width component of the atmospheric particulates in the flight path of the aircraft based on the temperature difference; (2) calculate a total mass load of the atmospheric particulates based on the density and the width component; and (3) determine an associated hazard level of the atmospheric particulates based on the total mass load of the atmospheric particulates. The aural message and/or the visual message may include an advisory, a caution, and/or a warning indicative of the associated hazard level of the atmospheric particulates.

In some embodiments, the non-transitory processor-readable medium may further store processor-executable instructions for causing the processor to generate an image indicative of the atmospheric particulates in the flight path of the aircraft, the image indicative of the total mass load of the atmospheric particulates in the flight path of the aircraft, and provide the image to the flight crew via the output device.

In some embodiments, the first wavelength may be about 10.8 um and the second wavelength may be about 12 um, the atmospheric particulates may include volcanic ash, and the non-transitory processor-readable medium may further store processor-executable instructions for causing the at least one processor to: (1) calculate a temperature difference between the second wavelength and the first wavelength; (2) determine a presence of ice crystals in the flight path of the aircraft and/or an associated hazard level based on the temperature difference between the second wavelength and the first wavelength; (3) generate an advisory, a caution, and/or a warning indicative of the presence of ice crystals in the flight path of the aircraft; and (4) provide the advisory, the caution, and/or the warning indicative of the presence of ice crystals in the flight path of the aircraft to the flight crew via the output device.

In some embodiments, the sensors may further include a third sensor configured to capture a third infrared signal having a third wavelength of about 8.7 um, and the non-transitory processor-readable medium may further store processor-executable instructions for causing the processor to: (a) determine a presence of $SO_2$ gas in the flight path of the aircraft based on the third infrared signal; (b) generate an advisory, a caution, and/or a warning indicative of a presence of volcanic ash in the flight path of the aircraft based on the presence of $SO_2$ gas in the flight path of the aircraft; and (c) provide the advisory, the caution, and/or the warning to the flight crew via the output device.

In a further aspect, the inventive concepts disclosed herein are directed to a method for detecting and avoiding atmospheric particulates in a flight path of an aircraft, including: (1) receiving, by a processor executing processor-executable instructions stored in a non-transitory processor-readable medium, a signal via an input port, the signal indicative of one or more electromagnetic signals captured by one or more sensor coupled with the aircraft from a flight path of the aircraft, the electromagnetic signals including at least two infrared wavelengths different from one another; (2) calculating, by the processor, a temperature difference between a first infrared wavelength and a second infrared wavelength of the at least two infrared wavelengths; (3) determining, by the processor, a presence of atmospheric particulates in the flight path of the aircraft based on the temperature difference; (4) generating, by the processor an aural message and/or a visual message indicative of the presence of atmospheric particulates in the flight path of the aircraft; and (5) providing the aural message and/or the visual message to a flight crew via an output device.

In some embodiments, the method may also include: (6) determining, by the processor, a density and/or a width component of the atmospheric particulates in the flight path of the aircraft based on the temperature difference; (7) calculating, by processor, a total mass load of the atmospheric particulates based on the density and/or the width component; and (8) determining, by the processor, an associated hazard level of the atmospheric particulates based on the total mass load of the atmospheric particulates. The aural message and/or the visual message may be indicative of the associated hazard level of the atmospheric particulates.

In some embodiments, the method may also include determining an alternate flight path based on one or more of: the flight path of the aircraft, the presence of atmospheric particulates in the flight path of the aircraft, and the associated hazard level of the atmospheric particulates; and providing the alternate flight path to the flight crew via the output device.

In some embodiments, the method may also include providing an image of the atmospheric particulates in the flight path of the aircraft to the flight crew via the output device, the image being indicative of the total mass load of the atmospheric particulates in the flight path of the aircraft.

In some embodiments, providing the aural message and/or the visual message indicative of the presence of atmospheric particulates in the flight path of the aircraft to the flight crew via the output device may further include prioritizing a plurality of visual and aural messages provided to the flight crew including the aural message and/or the visual message.

In some embodiments, the first infrared wavelength may be about 10.8 um and the second infrared wavelength may be about 12 um.

In some embodiments, the infrared wavelengths may include a third infrared wavelength of about 8.7 um, and the method may also include determining a presence of $SO_2$ gas in the flight path of the aircraft based on the third infrared wavelength, and providing an advisory, a caution, and/or a warning indicative of a presence of volcanic ash in the flight path of the aircraft to the flight crew via the output device.

BRIEF DESCRIPTION OF THE DRAWINGS

Like reference numerals in the figures may represent and refer to the same or similar element or function. Implementations of the instant inventive concepts may be better understood when consideration is given to the following detailed description thereof. Such description makes reference to the annexed pictorial illustrations, schematics, graphs, drawings, and appendices, which are not necessarily to scale, and in which some features may be exaggerated and some features may be omitted or may be represented schematically in the interest of clarity. In the drawings.

DETAILED DESCRIPTION

Figure 1:
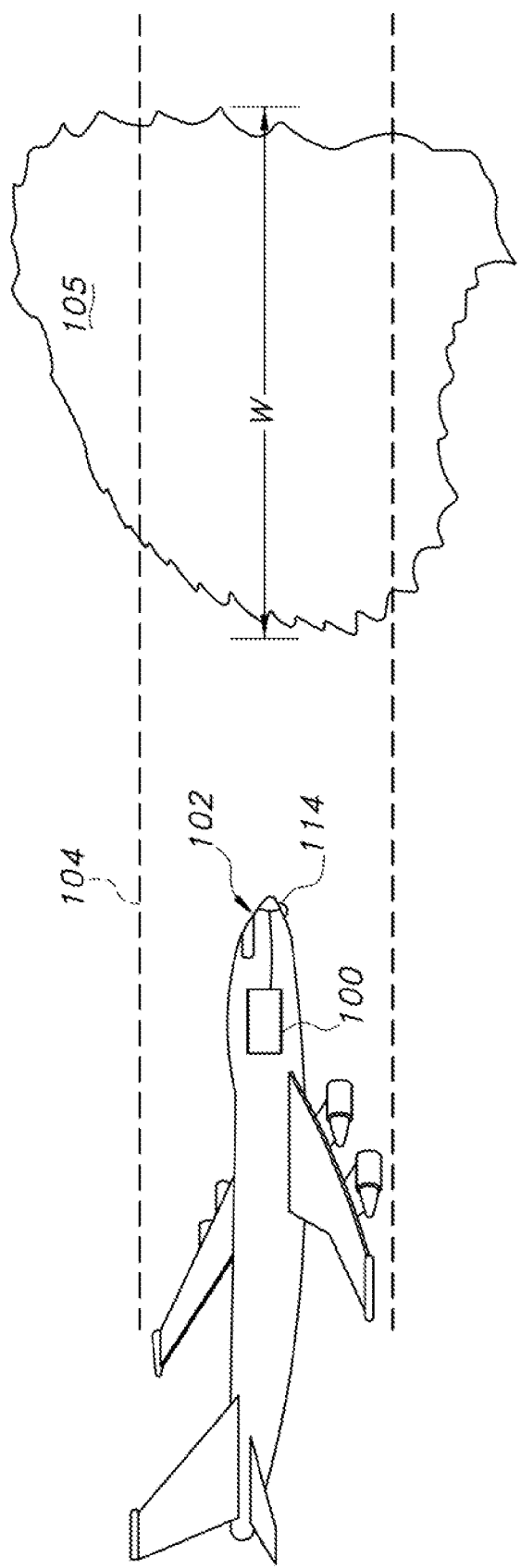
FIG. 1 is a diagram of an embodiment of an airborne system for detecting and avoiding atmospheric particulates according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a' and "an" are intended to include one or at least one and the singular also includes the plural unless it is obvious that it is meant otherwise.

As used herein "aircraft" is intended to include vehicles or projectiles travelling through the atmosphere, including but not limited to manned vehicles, unmanned vehicles, heavier-than-air vehicles, lighter-than-air vehicles, fixed wing aircraft, rotary wing aircraft, drones, and any other vehicles or projectiles traveling through Earth's atmosphere. Further, the term "aircraft" is intended to include ballistic vehicles, booster vehicles, and atmospheric reentry vehicles to the extent such vehicles travel through Earth's atmosphere.

As used herein the term "atmospheric particulates" includes particulates such as volcanic ash plumes or clouds, ice crystals, smoke, dust, or other particulates suspended, dispersed, aerosolized, or otherwise present in the atmosphere, and may also include gasses such as $SO_2$, $CO$, $CO_2$, liquid droplets, or other accumulations of solid, liquid, and/or gaseous materials that may be hazardous to aircraft.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment, and embodiments of the inventive concepts disclosed may include one or more of the features described herein, or any combination of sub-combination of two or more such features, along with any other features which may not necessarily be described or inherently present in the instant disclosure.

Broadly, embodiments of the inventive concepts disclosed herein are directed to airborne systems and methods for detecting atmospheric particulates in the flight path of an aircraft, evaluating a hazard level of the detected atmospheric particulates, alerting fight crews and/or control centers (e.g., onboard flight crews or remote flight crews or operators in the case of unmanned aircraft), and providing images of the atmospheric particulates to enable flight crews to determine the proper action to avoid the hazard. In some embodiments, the hazard level, location, or other pertinent information about the detected volcanic ash or other atmospheric particulates may be communicated, transmitted, or otherwise provided to control centers or other aircraft in automated or manual fashion.

In some embodiments, to avoid adding to flight crew task load, notifications, advisories, alerts, messages, or warnings of atmospheric particulates present in the flight path of the aircraft, along with information indicative of density, hazard level, and proposed flight path alterations, may be prioritized and incorporated with existing enhanced vision systems and/or engine indicating and crew alerting systems as will be described herein.

In some embodiments, system and methods according to the inventive concepts disclosed herein may provide flight crews with notifications or alerts indicative of the presence of atmospheric particulates in the flight path of the aircraft in the form of one or more aural and/or visual alerts or messages. In some embodiments, the aural or visual messages or alerts may include a hazard level indication such as an advisory (e.g., a relatively low hazard level), a caution (e.g., a relatively higher hazard level), or a warning (e.g., a high hazard level). Further, in some embodiments, the aural or visual messages may include an image of the atmospheric particulates, which image may be indicative of a density, hazard level, and/or a total mass load of the atmospheric particulates.

Figure 2:
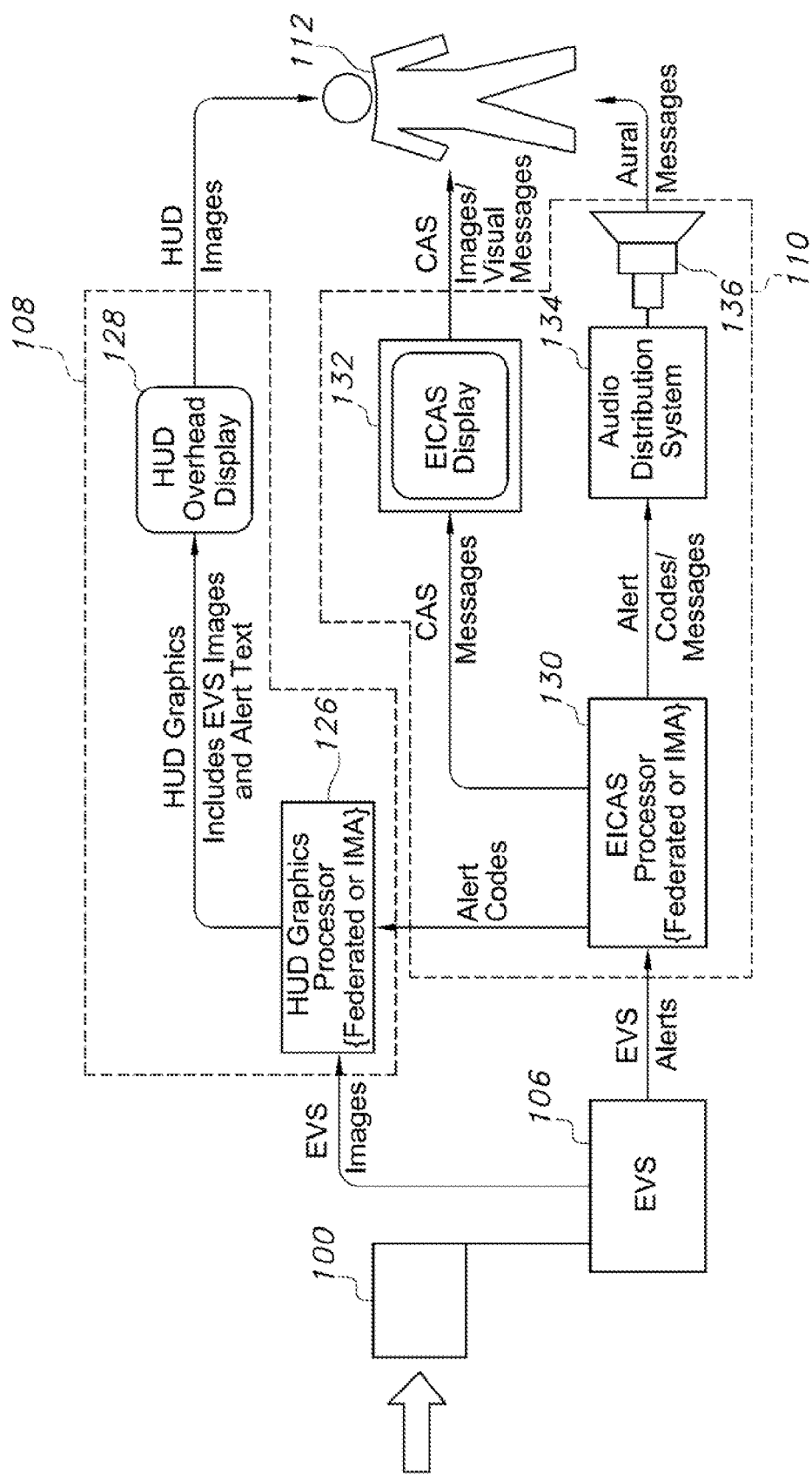
FIG. 2 is a diagram of the airborne system for detecting and avoiding atmospheric particulates of FIG. 1.
Figure 3:
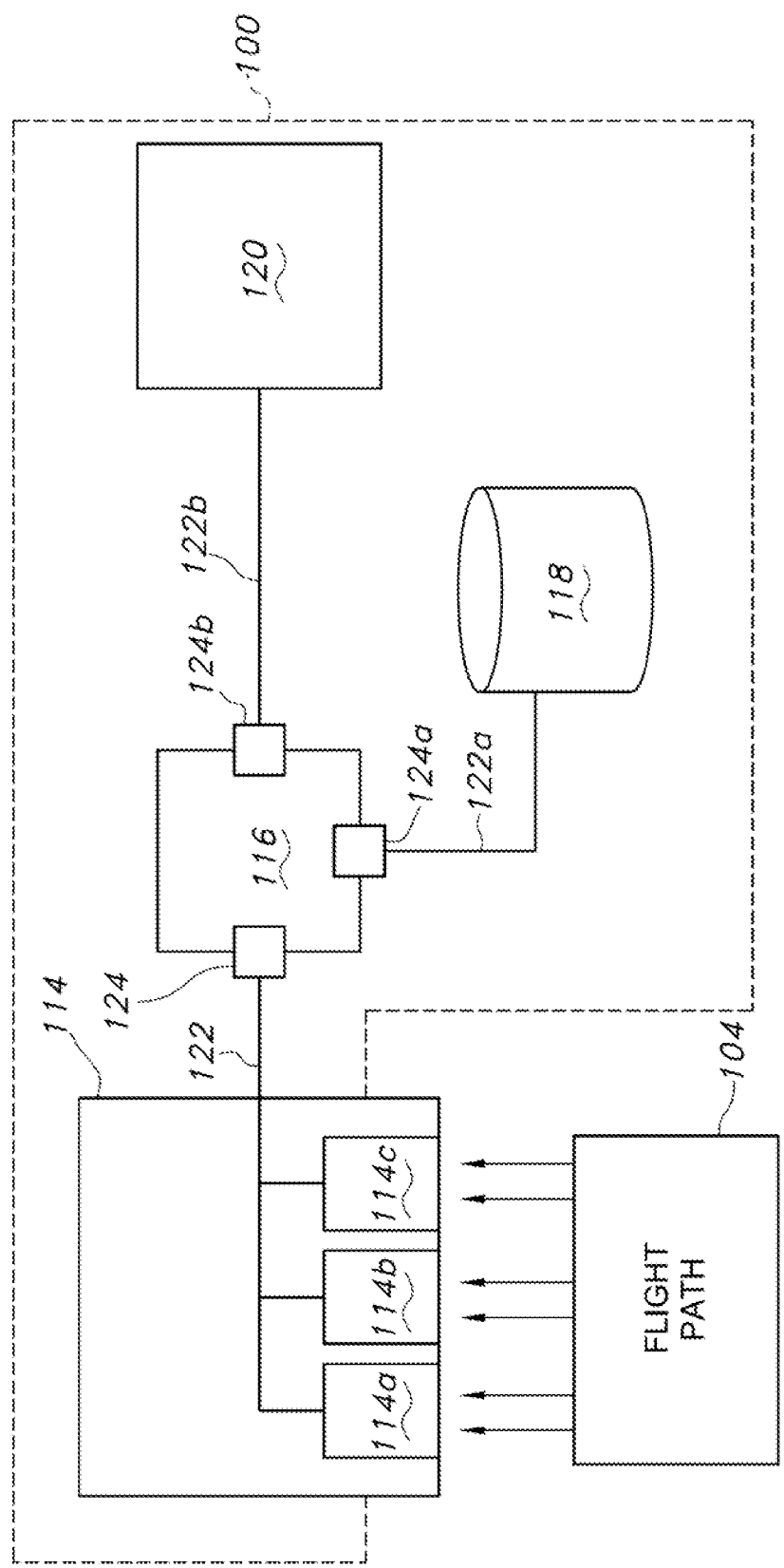
FIG. 3 is a diagram of an embodiment of an airborne system for detecting atmospheric particulates according to the inventive concepts disclosed herein.

Referring now to FIGS. 1-3, an airborne system 100 for detecting and avoiding atmospheric particulates is shown therein as being carried by an aircraft 102 configured to fly along a flight path 104. A cloud, plume, or other accumulation of atmospheric particulates 105 at least partially intersects the flight path 104 of the aircraft 102. The atmospheric particulates 105 in the flight path 104 have a density and include a width component W along the flight path 104. The flight path 104 may be a current flight path and/or a planned flight path of the aircraft 102. Although the flight path 104 is shown as being substantially linear, in some embodiments, the flight path 104 may be curved and/or may change elevation, curvature, or direction in the area where the atmospheric particulates 105 intersect the flight path 104. Further, the atmospheric particulates 105 may be stationary or may move relative to the flight path 104 as will be appreciated by persons of ordinary skill in the art.

While the system 100 is shown in FIG. 2 as a stand-alone system, in some embodiments the system 100 may be integrated with (e.g., may share hardware and/or software) with any desired avionics system of the aircraft 102, such as an Enhanced Vision System (EVS) 106, a Heads-Up Display (HUD) system 108, and an Engine Indicating and Crew Alerting System (EICAS) 110 of the aircraft 102 to provide a member of a flight crew 112 with information from one of more of the systems of the aircraft 102.

Referring now to FIG. 3, an embodiment of the airborne system 100 for detecting and avoiding atmospheric particulates may include a sensor 114, a processor 116, a memory 118, and an I/O device 120. In some embodiments, the atmospheric particulates detection system 100 may be implemented as a stand-alone system, while in some embodiments one or more of the sensor 114, the processor 116, the memory 118, and the I/O port 120 may be shared with or incorporated in any desired system of the aircraft 108 such as the EVS 102, the HUD 104, and/or the EICAS 106.

The sensor 114 may be configured to detect or capture a broad spectrum of electromagnetic signals and to transmit one or more signals (e.g., electrical or optical) to the processor 116 via a path 122 (e.g., a data bus) and an I/O port 124 indicative of the captured electromagnetic signals. The sensor 114 and may be positioned, coupled with, or otherwise associated with the aircraft 102 so as to detect signals from a space or area in the flight path 104 of the aircraft 102 at any desired distance from the aircraft 102 and at any desired resolution or sensitivity.

In some embodiments, the sensor 114 may be implemented as an infrared sensor similarly to the infrared sensors described in U.S. application Ser. No. 13/247,691, filed on Sep. 28, 2011, and entitled "Spectrally Enhanced Vision System for Low Visibility Operations," the entire disclosure of which is hereby incorporated herein by reference. Further, in some embodiments, the sensor 114 may be configured to prevent artifacts and may be implemented similarly to the infrared radiation detectors described in U.S. application Ser. No. 13/751,244, filed on Jan. 28, 2013, and entitled "Artifact Prevention System, Device, and Method for an Electromagnetic Imaging System," the entire disclosure of which is hereby incorporated herein by reference. In some embodiments, the sensor 114 may be protected from solar damage and may be implemented similarly to the electromagnetic sensors described in U.S. application Ser. No. 13/864,991, filed on Apr. 17, 2013, and titled "Vision System and Method Having Improved Performance and Solar Mitigation," the entire disclosure of which is hereby incorporated herein by reference.

In some embodiments, the sensor 114 may be configured to detect or capture one or more electromagnetic signals having a plurality of wavelengths and including long-wave infrared wavelengths, short-wave infrared wavelengths, visible wavelengths, ultraviolet wavelengths, and any other desired electromagnetic wavelengths.

The sensor 114 may include one or more filters, glare shields, apertures, masks, and combinations thereof, configured to enable the sensor 114 to capture or detect any desired wavelength, wavelength band, channel, or portion of the electromagnetic energy spectrum. For example, the sensor 114 may include a first filter such that the sensor 114 is configured to detect a first signal having a first wavelength or first wavelength band and a second filter such that the sensor 114 is configured to detect second signal having a second wavelength or a second wavelength band. In some embodiments, the first and second wavelengths or wavelength bands may be different from one another, and in some embodiments, the first and second wavelengths or wavelength bands may partially or completely overlap with one another. The sensor 114 may include one or more electromagnetic detectors, infrared detectors, longwave infrared detectors, shortwave infrared detectors, or combinations thereof.

In some embodiments, the sensor 114 may include two or more sensing elements, such as a sensing element 114a, a sensing element 114b, and a sensing element 114c as shown in FIG. 3. It is to be understood that any desired number of sensing elements may be implemented with the sensor 114, such as one, two, three, four, or more sensing elements.

In some embodiments, the sensing element 114a may be configured to capture an electromagnetic signal having a first bandwidth or bandwidth band, the sensing element 114b may be configured to capture an electromagnetic signal having a second bandwidth or bandwidth band, and the sensing element 114c may be configured to capture an electromagnetic signal having a third wavelength of wavelength band. The first, second, and third wavelengths or wavelength bands may be different from one another, or one or more of the first, second, and third wavelengths or wavelength bands may partially or completely overlap with one another. In some embodiments, the first wavelength may be about 10.8 um, the second wavelength may be about 12 um, and the third wavelength may be about 8.7 um.

It is to be appreciated that any desired wavelengths, wavelength bands, or combinations thereof may be implemented with embodiments of the inventive concepts disclosed herein, provided such wavelengths, wavelength bands, or combinations thereof are selected to allow the system 100 to detect atmospheric particulates by processing one or more respective signals with one or more suitable algorithms. The infrared wavelengths described herein are exemplary only, and that in some embodiments the accuracy and/or integrity of the detection algorithms for the system 100 according to the inventive concepts disclosed herein may be optimized by using different frequencies (e.g., optimized to support EVS or EICAS operations, as well as ash/ice/$SO_2$ detection).

The processor 116 is configured to read and execute processor-executable instructions or code and may be implemented as at least one or one or more microprocessor, digital signal processor, central processing unit, application specific integrated circuit (ASIC), field-programmable gate array (FPGA), multicore processor, or combinations thereof. The processor 116 is coupled with the sensor 114 via the path 122 and the I/O port 124 such that data and/or signals may be exchanged by the processor 116 and the sensor 114. The path 122 may be implemented as a wired connector, an optical fiber, a wireless link, a data bus, a physical computer port, a virtual computer port, or combinations thereof. The processor 116 is also operably coupled with the memory 118 via a path 122a (e.g., implemented similarly to the path 122) and an I/O port 124a such that the processor 116 reads information and processor executable instructions or code stored in the memory 118 and reads, stores or manipulates data or data structures stored in the memory 118.

The memory 118 may be implemented as a non-transitory processor-readable medium configured to store software, data, data structures, data tables, logic, and/or processor-executable code and/or instructions as described herein. In some embodiments, the memory 118 may be implemented as a hard drive, a solid state drive, a flash memory, a RAM memory, a ROM memory, a CD-ROM, a DVD-ROM, a memory card, a disk, an optical drive, a cloud memory hosted via one or more web servers or distributed computing systems, or combinations thereof. The memory 118 is configured to exchange data and/or signals with the processor 116 via the path 122a.

The I/O device 120 may be implemented as an input or an output device, such as a touchscreen, a speaker, a physical keyboard, a virtual keyboard, headphones, a monitor, a HUD display, a head down display, a primary flight display, or combinations thereof. The I/O device 120 is coupled with the processor 116 via a path 122b and an I/O port 124b and is configured to bi-directionally exchange data and/or signals with the processor 116 and to present data in a form perceivable by a user, such as a member of the flight crew 112. Further, in some embodiments, the I/O device 120 may be implemented as an antenna, a transmitter, or a computer port configured to exchange data or signals with any desired external device or processor, such as a control center or the avionics systems of the aircraft 102 as shown in FIG. 2. In some embodiments, the I/O device 120 may be implemented as a data bus, an IP port, and optical port, a wireless port, a virtual port, an Ethernet port, a USB port, or combinations thereof, and in some embodiments the I/O device 120 may be omitted and/or the processor 116 may be coupled with any desired external device, system, or processor.

Referring back to FIG. 2, the EVS 106 may include one or more sensors, processors, and non-transitory processor-readable media, and may be configured to provide the flight crew 112 with a variety of information, such as by providing one or more alerts or messages and/or by exchanging data or signals with one or more of the HUD system 108 and the EICAS system 110 or any other system, display, or device of the aircraft 102.

The EVS 106 may be configured to detect, capture, or receive information indicative of the external surroundings of the aircraft 102 (e.g., the flight path 104), combine the information with information from one or more databases or other sources (e.g., weather radar information, terrain maps, air traffic information, navigation information, airport information, and distance, bearing, position, location, and altitude information) and to present flight crews with enhanced or synthetic images. For example, the EVS 106 may overlay multiple layers of information including images, graphical indicators, alphanumeric characters, or moving radar data onto a display, such as the HUD system 108 or the primary flight display.

In some embodiments, the system 100 may be integrated with the EVS 106 and/or the EICAS 110, or may share one or more hardware or software components such as sensors, processors, memories, processor executable code, or data with the EVS 106 and/or the EICAS 110 as will be appreciated by persons of ordinary skill in the art having the benefit of the instant disclosure.

The HUD system 108 may include a processor 126 and a HUD display 128 configured to provide the flight crew 112 and/or the pilot with a variety of HUD images and other information. In some embodiments, the HUD system 108 may be configured such that the HUD display 128 may operate as a primary flight display, as will be appreciated by persons of ordinary skill in the art.

The EICAS 110 may include a processor 130, a display 132, and an audio distribution system 134 having a speaker 136. The EICAS 110 may be configured to provide the flight crew 112 with one or more messages, images, or aural alerts, and in some embodiments may transmit certain messages, alerts, or alert codes to the HUD system 108 to be provided to the flight crew 112 via the HUD display 128, for example.

The EICAS 110 may be configured to prioritize a plurality of messages, alerts, and information for the flight crew 112, and to present the messages, alerts, or other information to the flight crew via the display 132, the audio distribution system 134, and/or via the HUD display 128 or other primary flight display. In some embodiments, the EICAS 110 and/or the system 100 for detecting and avoiding atmospheric particulates may be configured to cooperate with one another to cooperatively or independently prioritize notifications, alerts, advisories, or other information from the system 100 for detecting and avoiding atmospheric particulates in the normal course of EICAS 110 operations, and to present appropriate information to members of the flight crew 112.

The memory 118 stores one or more imaging algorithms, hazard evaluation algorithms, and/or alerting algorithms as processor-readable or processor-executable code or instructions for causing the processor 116 to carry out the logic, functionality, or methods described herein.

Figure 4:
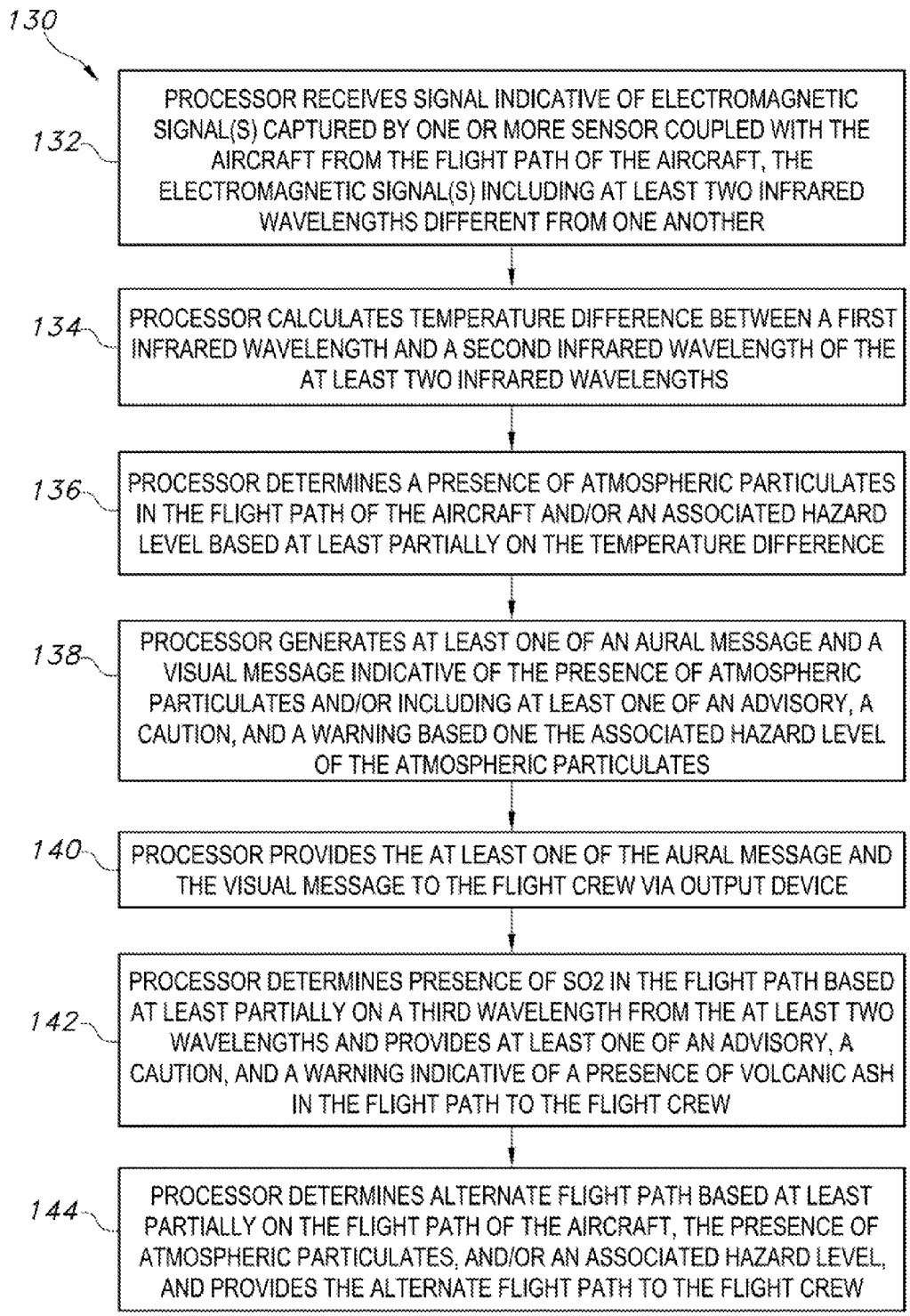
FIG. 4 is a diagram of a method of detecting and avoiding atmospheric particulates according to the inventive concepts disclosed herein.

Referring now to FIG. 4, shown therein is an embodiment of a method 130 for detecting and avoiding atmospheric particulates which may be implemented by the airborne system 100 for detecting and avoiding atmospheric particulates according to the inventive concepts disclosed herein.

At a step 132, the processor 116 may receive a signal (e.g., via the I/O port 124) indicative of one or more electromagnetic signals captured, sensed, or detected by one or more sensor (e.g., the sensor 114) coupled with the aircraft 102 from the flight path 104 of the aircraft 102 (e.g., from a space, volume, or external scene or surroundings within the flight path 104 of the aircraft 102), the electromagnetic signals including at least two infrared wavelengths being different from one another. In some embodiments, the processor 116 may receive one or more of a first signal indicative of a first wavelength or wavelength band from a first sensor element 114a, a second signal indicative of a second wavelength or wavelength band from a second sensor element 114b, and/or a third signal indicative of a third wavelength or wavelength band from a third sensor element 114c.

At a step 134, the processor 116 may calculate or determine a temperature difference between a first infrared wavelength and a second infrared wavelength of the at least two infrared wavelengths. Alternatively, or additionally, the processor 116 may calculate or determine a temperature difference between the second infrared wavelength and the first infrared wavelength in some embodiments. For example, in some embodiments, the first infrared wavelength may be about 10.8 um, and the second infrared wavelength may be about 12 um, and the temperature difference between the first infrared wavelength and the second infrared wavelength may be interpreted by the processor 116 as indicative of atmospheric particulates including volcanic ash. In some embodiments where the first infrared wavelength is about 10.8 um and the second infrared wavelength is about 12 um, the temperature difference between the second infrared wavelength and the first infrared wavelength may be interpreted by the processor 116 as indicative of atmospheric particulates including ice crystals. In some embodiments, the processor 116 may determine a density of the atmospheric particles 105 based at least partially on the temperature difference between the first and second wavelengths and/or may determine a width component W of the atmospheric particulates 105 in the flight path 104.

At a step 136, the processor 116 may determine a presence of atmospheric particulates 105 in the flight path 104 of the aircraft 102 based at least partially on the temperature difference between the first infrared wavelength and the second infrared wavelength. In some embodiments, the processor 116 may determine a total mass load of the atmospheric particulates 105 based on the density and the width component W of the atmospheric particulates 105 in the flight path 104. In some embodiments, the processor 116 may determine an associated hazard level of the atmospheric particulates based at least partially on the total mass load of the atmospheric particulates 105 in the flight path 104 of the aircraft 102. For example, a low hazard level may result in an advisory being generated and transmitted to the flight crew 112 by the system 100, a higher hazard level may result in a caution being generated and transmitted to the flight crew 112 by the system 100, and a high hazard level may result in a warning being generated and transmitted to the flight crew 112 by the system 100. In some embodiments, the processor 116 may characterize the atmospheric particulates 105 as volcanic ash or ice crystals as described above.

At a step 138, the processor 116 may generate at least one of an audible message and a visual message indicative of the presence of atmospheric particulates 105 in the flight path 104 of the aircraft 102. The at least one of the audible message and the visual message may include at least one of an advisory, a caution, and a warning indicative of the associated hazard level of the atmospheric particulates 105 in the flight path 104 of the aircraft 102. In some embodiments, the processor 116 may generate the at least one of the advisory, the caution, and the warning indicative of the associated hazard level of the atmospheric particulates 105 in the flight path 104 of the aircraft 102 at least partially based on the total mass load of the atmospheric particulates 1 05, the density of the atmospheric particulates 105, and/or the width component W of the atmospheric particulates 105 in the flight path 104. In some embodiments, total mass load thresholds for advisories, cautions, and warnings indicative of atmospheric particulates 105 in the flight path 104 of the aircraft 102 and/or associated hazard levels of the atmospheric particulates 105 may be determined by aircraft manufacturers, engine manufacturers, probe manufacturers, avionic system manufacturers, governing bodies or associations, or combinations thereof. Alternatively or additionally, in some embodiments a third-party may derive thresholds from historical data.

In some embodiments, any detected presence, density, and/or total mass load of atmospheric particulates 105 including volcanic ash may result in an advisory. In some embodiments, cautions and warnings may be triggered by the density or total mass load of atmospheric particles 105 exceeding a predetermined threshold, which may be set to a default threshold and/or may be tailored to engine type, aircraft type, flight crew, pilot, or operator preferences, applicable rules or regulations, or combinations thereof. Further, in some embodiments, any level of ice crystals may result in an advisory and cautions and warnings may be tailored to aircraft type and equipage such as aircraft control surfaces, engines, and air data sensors.

At a step 140, the processor 116 may provide the at least one of the audible message and the visual message (e.g., including the at least one of the advisory, the caution, and the warning) indicative of the presence of atmospheric particulates 105 in the flight path 104 of the aircraft 102 to the flight crew 112 via the output device 120. In some embodiments, the visual message may include at least one image indicative of the atmospheric particulates 105 in the flight path 104 of the aircraft 102. It is to be appreciated that the audible message and/or the visual message may be provided to the flight crew 112 in real-time or in near real-time (e.g., within a relatively short time of detecting the atmospheric particulates 105) so as to enable the flight crew 112 to assess the hazard and avoid the atmospheric particulates 105 as appropriate.

In some embodiments, the at least one of the image indicative of the atmospheric particulates 105, the visual message, and the aural message may be provided via, or fed into, a Crew Alerting System or the EICAS 110, so that aural, visual, and/or textual messages are prioritized properly with all other potential alerts by the EICAS 110 and presented to the flight crew 112. In some embodiments, the processor 116 may provide two or more or all of: the advisory, the caution, and the warning indicative of the presence of atmospheric particulates 105 in the flight path 104 of the aircraft 102 as two or more or of all of: an image indicative of the atmospheric particulates, a visual message, and an aural message to the flight crew 112 via the output device 120.

Advisories, cautions, and warnings may be functions of the image intensity for atmospheric particulates 105 such as volcanic ash, high altitude ice crystals, and $SO_2$. Further, the image intensity may be a function total mass load of the atmospheric particulates 105 present in the atmosphere (e.g., atmospheric particulate 105 density times the width component W of atmospheric particulates 105 in the flight path 104 of the aircraft 102).

In some embodiments, the processor 116 may interface with the EVS 106 and/or the EICAS 110 to provide the flight crew 112 with one or more image or other graphic user interface, symbolic, or pictorial representations of the atmospheric particulates 105 in the flight path 104 of the aircraft 102 and/or the associated hazard level, such as by transmitting an image or other representation indicative of the atmospheric particulates 105 or the associated hazard level to the HUD 104 for display on the HUD 104. The image may be indicative of the density or total mass load of the atmospheric particulates 105 or of the associated hazard level, such as by including any desired intensity, color, density, hazard indicator, or any other feature or indication as appropriate.

The processor 116 may provide one or more images or indicators of atmospheric particulates 105 to the EVS 106 as background to primary flight indications via the HUD system 108 along with the at least one of the advisory, the caution, and the warning indicative of the presence of atmospheric particulates 105 in the flight path 104 of the aircraft 102. Such images may be provided in a manner that is flight-phase dependent in some embodiments. For example, the HUD system 108 may be configured to display typical EVS 106 images during low altitude operations, and atmospheric particulate images may be displayed en-route or above a predetermined altitude. Further, alerts or messages (e.g., from multiple systems, including ash/ice/$SO_2$) may be presented in the context of standard primary flight display indications by the HUD system 108. Further, EICAS 110 messages and aural alerts may be driven by the EVS 106 and/or by the processor 116.

At a step 142, the processor 116 may determine a presence of $SO_2$ in the flight path 104 of the aircraft 102 based at least partially on a third wavelength (e.g., 8.7 um) from the at least two wavelengths, and may provide at least one of an advisory, a caution, and a warning indicative of the presence of volcanic ash in the flight path 104 of the aircraft 102 as at least one of an image indicative of the volcanic ash, a visual message, and an aural message indicative of a presence of the volcanic ash to the flight crew 112 via the I/O device 120. In some embodiments, any detected level of $SO_2$ may result in an advisory only, and in some embodiments the presence of $SO_2$ may be correlated with any other desired information and may result in a caution, alert, or warning. In some embodiments, step 142 may be omitted.

Figure 5:
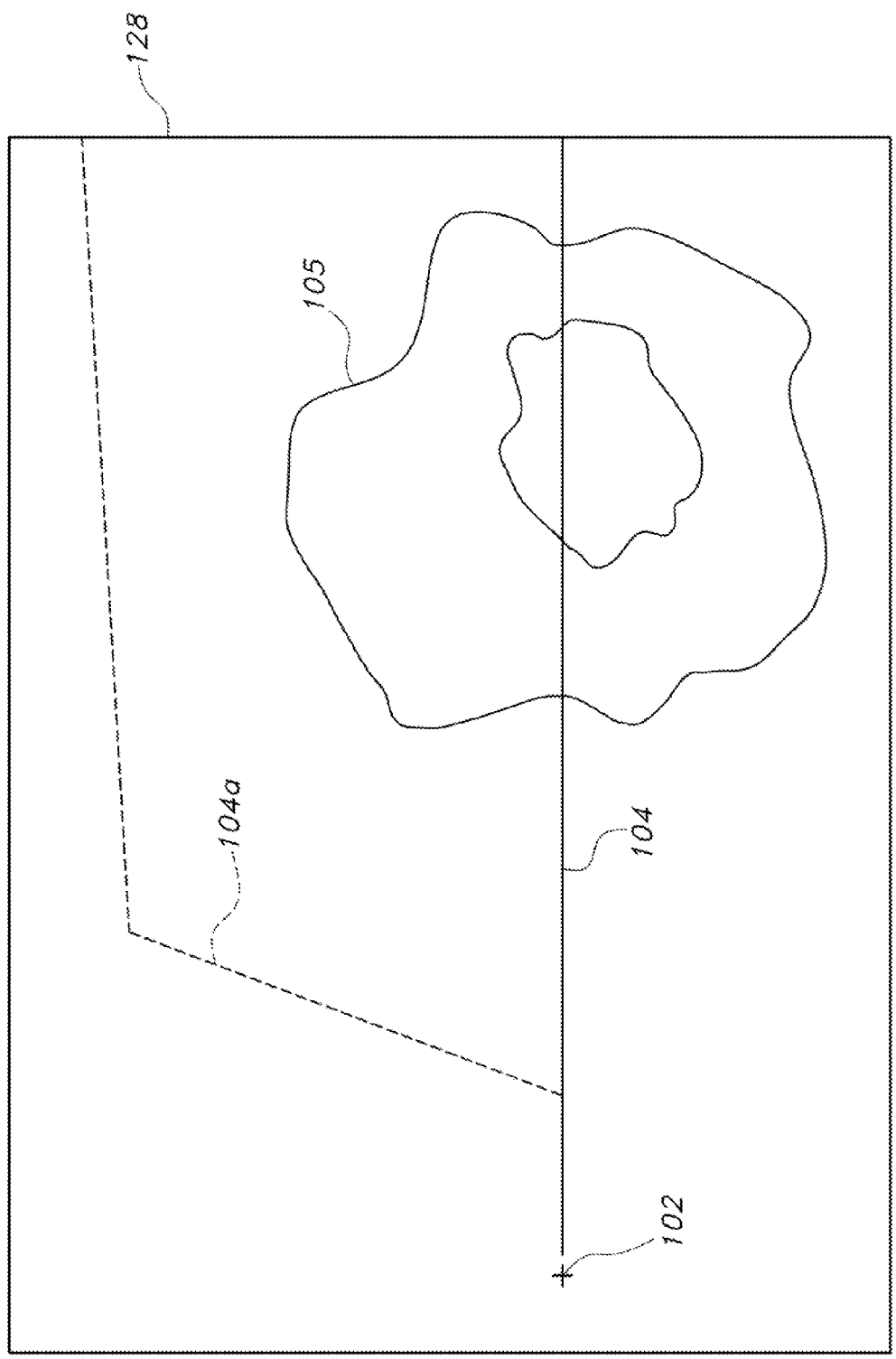
FIG. 5 is a diagram of an embodiment of a method of altering a flight path to avoid atmospheric particulates according to the inventive concepts disclosed herein.

At a step 144, the processor 116 may calculate or determine an alternate flight path 104a based at least partially on the flight path 104 of the aircraft 102 and the presence and/or associated hazard level of atmospheric particulates 105 in the flight path 104 of the aircraft 102, and may provide the alternate flight path 104a to the flight crew 112 via the HUD display 128 as shown in FIG. 5. Any number of alternate flight paths 104a may be calculated and provided to the flight crew 112 for selection, or the system 100 may select an optimal alternate flight path 104a and provide it to the flight crew 112. The flight crew 112 may select an alternate flight path 104a, reject an alternate flight path 104a, modify an alternate flight path 104a, transmit or relay an alternate flight path 104a to a control station for approval or notification, or combinations thereof. Although the flight path 104, the alternate flight path 104a and the atmospheric particulates 105 are shown in a 2D manner in FIG. 5, it is to be appreciated that the flight path 104 and the alternate flight path 104a may have any desired 3D shape, curvature, direction, or profile, and may include an associated turn, climb, descend, or changes in airspeed, or combinations thereof. Further, in some embodiments a vertical or height component (e.g., substantially perpendicular to the width component W) of the atmospheric particulates 105 may be taken into account by the system 100 during alternate flight path 104a calculation or determination.

A selected alternate flight path 104a may be communicated to other aircraft, or to any desired ground centers, or air control authorities, for example. In some embodiments, flight path alteration to avoid atmospheric particulates may be a dynamic and/or automated process carried out by one or more avionics systems or processors of an aircraft or an unmanned aerial vehicle, as will be understood by persons of ordinary skill in the art having the benefit of the instant disclosure.

Embodiments of the inventive concepts disclosed herein may expand the capability of the EVS and EICAS systems to detect hazards (which cannot be detected by alternate means) during en-route operations thus expanding the value of EVS and EICAS to the entire flight regime. Further, embodiments of the inventive concepts disclosed herein define new value for HUD systems and EVS for air transport markets that are disrupted by volcanic activity near major flight routes. In some embodiments, an "advisory only" solutions can be implemented and fielded quickly and may not depend upon analysis of aircraft, engine, or probe performance in varying levels of ash or ice density. Some versions of the system 100 can be used to determine hazards levels of differing total mass loads of ash or ice to allow generation of cautions and warnings to allow flight into safe or "advisory only" levels of ash, ice, or $SO_2$, while recommending an avoidance maneuver (e.g., altering the flight path) for "cautionary" or "warning" levels of ash or ice.

It is to be understood that embodiments of methods according to the inventive concepts disclosed herein may include one or more of the steps described herein. Further, such steps may be carried out in any desired order and two or more of the steps may be carries out simultaneously with one another. Two or more of the steps disclosed herein may be combined in a single step, and in some embodiments, one or more of the steps may be carried out as two or more sub-steps.

From the above description, it is clear that the inventive concepts disclosed herein is well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. An airborne system for detecting atmospheric particulates, comprising:
   at least one sensor coupled with an aircraft and configured to capture at least one electromagnetic signal from a flight path of the aircraft, the at least one electromagnetic signal including at least a first infrared wavelength and a second infrared wavelength different from the first infrared wavelength;
   an output device configured to provide at least one of: an image, a visual message, and an aural message in a form perceivable by a flight crew member;
   at least one processor coupled with the at least one sensor, the output device, and with a non-transitory processor-readable medium storing processor-executable instructions for causing the at least one processor to:
   receive a signal from the at least one sensor indicative of the at least one electromagnetic signal via an input port;
   calculate a temperature difference between the first infrared wavelength and the second infrared wavelength;
   determine a presence of atmospheric particulates in the flight path of the aircraft based at least partially on the temperature difference between the first infrared wavelength and the second infrared wavelength;
   determine a density and a width component of the atmospheric particulates in the flight path of the aircraft based at least partially on the temperature difference;
   calculate a total mass load of the atmospheric particulates based at least partially on the density and the width component;
   determine an associated hazard level of the atmospheric particulates based at least partially on the total mass load of the atmospheric particulates;
   generate at least one of an aural message and a visual message indicative of the presence of atmospheric particulates in the flight path of the aircraft; and
   provide the at least one of the aural message and the visual message to a flight crew via the output device, wherein the at least one of the aural message and the visual message includes at least one of an advisory, a caution, and a warning indicative of the associated hazard level of the atmospheric particulates.

2. The system of claim 1, wherein the non-transitory processor readable medium further stores processor-executable instructions for causing the at least one processor to:
   generate an image of the atmospheric particulates in the flight path of the aircraft, the image indicative of the total mass load of the atmospheric particulates; and
   provide the image to the flight crew via the output device.

3. The system of claim 1, wherein the visual message includes an image of the atmospheric particulates.

4. The system of claim 1, wherein the at least one of the aural message and the visual message is provided to the flight crew via a crew alerting system configured to prioritize a plurality of images, visual, and aural messages including the at least one of the aural message and the visual message.

5. The system of claim 1, wherein the first infrared wavelength is 10.8 um and the second infrared wavelength is 12 um, and the atmospheric particulates include volcanic ash, and wherein the non-transitory processor-readable medium further stores processor-executable instructions for causing the at least one processor to:
   calculate a temperature difference between the second infrared wavelength and the first infrared wavelength;
   determine a presence of ice crystals in the flight path of the aircraft and an associated hazard level based at least partially on the temperature difference between the second infrared wavelength and the first infrared wavelength;
   generate at least one of an advisory, a caution, and a warning indicative of at least one of the presence of ice crystals in the flight path of the aircraft and the associated hazard level; and provide the at least one of the advisory, the caution, and the warning to the flight crew via the output device.

6. The system of claim 1, wherein the at least one electromagnetic signal further includes a third infrared wavelength of 8.7 um, and wherein the nontransitory processor-readable medium further stores processor-executable instructions for causing the at least one processor to:
   determine a presence of $SO_2$ gas in the flight path of the aircraft based at least partially on the third infrared wavelength;
   generate at least one of an advisory, a caution, and a warning indicative of at least one or a presence of volcanic ash in the flight path of the aircraft based at least partially on the presence of $SO_2$ gas; and
   provide the at least one of the advisory, the caution, and the warning to the flight crew via the output device.

7. An airborne system for detecting atmospheric particulates, comprising:
   at least two sensors coupled with an aircraft and configured to capture electromagnetic signals from a flight path of the aircraft, the at least two sensors including a first sensor configured to capture a first signal having a first infrared wavelength and a second sensor configured to capture a second signal having a second infrared wavelength different from the first infrared wavelength;
   an output device configured to provide at least one of: an image, a visual message, and an aural message in a form perceivable by a flight crew;
   at least one processor coupled with the at least two sensors, the output device, and with a non-transitory processor-readable medium storing processor-executable instructions for causing the at least one processor to:
      receive at least one signal from each of the at least two sensors indicative of at least the first infrared signal and the second infrared signal via an input port;
      calculate a temperature difference between the first wavelength and the second wavelength;
      determine a presence of atmospheric particulates in the flight path of the aircraft based at least partially on the temperature difference;
      determine a density and a width component of the atmospheric particulates in the flight path of the aircraft based at least partially on the temperature difference;
      calculate a total mass load of the atmospheric particulates based at least partially on the density and the width component;
      determine an associated hazard level of the atmospheric particulates based at least partially on the total mass load of the atmospheric particulates;
      generate at least one of an audio message and a visual message indicative of the presence of atmospheric particulates in the flight path of the aircraft; and
      provide the at least one of the aural message and the visual message to a flight crew via the output device, wherein the at least one of the aural message and the visual message includes at least one of an advisory, a caution, and a warning indicative of the associated hazard level of the atmospheric particulates.

8. The system of claim 7, wherein the non-transitory processor-readable medium further stores processor-executable instructions for causing the at least one processor to:
   generate an image indicative of the atmospheric particulates in the flight path of the aircraft, the image indicative of the total mass load of the atmospheric particulates in the flight path of the aircraft; and
   provide the image to the flight crew via the output device.

9. The system of claim 7, wherein the visual message includes an image of the atmospheric particulates.

10. The system of claim 7, wherein the first wavelength is 10.8 um and the second wavelength is 12 um, and the atmospheric particulates include volcanic ash, and wherein the non-transitory processor-readable medium further stores processor-executable instructions for causing the at least one processor to:
    calculate a temperature difference between the second wavelength and the first wavelength;
    determine at least one of a presence of ice crystals in the flight path of the aircraft and an associated hazard level based at least partially on the temperature difference between the second wavelength and the first wavelength;
    generate at least one of an advisory, a caution, and a warning indicative of the presence of ice crystals in the flight path of the aircraft; and
    provide the at least one of the advisory, the caution, and the warning indicative of the presence of ice crystals in the flight path of the aircraft to the flight crew via the output device.

11. The system of claim 7, wherein the at least two sensors further include a third sensor configured to capture a third infrared signal having a third wavelength of 8.7 um, and wherein the non-transitory processor-readable medium further stores processor-executable instructions for causing the at least one processor to:
    determine a presence of $SO_2$ gas in the flight path of the aircraft based at least partially on the third infrared signal;
    generate at least one of an advisory, a caution, and a warning indicative of a presence of volcanic ash in the flight path of the aircraft based at least partially on the presence of $SO_2$ gas in the flight path of the aircraft; and
    provide the at least one of the advisory, the caution, and the warning to the flight crew via the output device.

12. A method for detecting and avoiding atmospheric particulates in a flight path of an aircraft, comprising:
    receiving, by at least one processor executing processor-executable instructions stored in a non-transitory processor-readable medium, at least one signal via an input port, the at least one signal indicative of one or more electromagnetic signals captured by one or more sensor coupled with the aircraft from a flight path of the aircraft, the one or more electromagnetic signals including at least two infrared wavelengths different from one another;
    calculating, by the at least one processor, a temperature difference between a first infrared wavelength and a second infrared wavelength of the at least two infrared wavelengths;
    determining, by the at least one processor, a presence of atmospheric particulates in the flight path of the aircraft based at least partially on the temperature difference;
    determining, by the at least one processor, a density and a width component of the atmospheric particulates in the flight path of the aircraft based at least partially on the temperature difference;
    calculating, by the at least one processor, a total mass load of the atmospheric particulates based at least partially on the density and the width component;

determining, by the at least one processor, an associated hazard level of the atmospheric particulates based at least partially on the total mass load of the atmospheric particulates;

generating, by the at least one processor at least one of an aural message and a visual message indicative of the presence of atmospheric particulates in the flight path of the aircraft; and providing the at least one of the aural message and the visual message to a flight crew via an output device, wherein the at least one of the aural message and the visual message is further indicative of the associated hazard level of the atmospheric particulates.

13. The method of claim 12, further comprising:

determining an alternate flight path based at least partially on one or more of: the flight path of the aircraft, the presence of atmospheric particulates in the flight path of the aircraft, and the associated hazard level of the atmospheric particulates; and providing the alternate flight path to the flight crew via the output device.

14. The method of claim 12, further comprising providing at least one image of the atmospheric particulates in the flight path of the aircraft to the flight crew via the output device, the at least one image being indicative of the total mass load of the atmospheric particulates in the flight path of the aircraft.

15. The method of claim 14, wherein providing the at least one of the aural message and the visual message indicative of the presence of atmospheric particulates in the flight path of the aircraft to the flight crew via the output device further comprises prioritizing a plurality of visual and aural messages provided to the flight crew including the at least one of the aural message and the visual message.

16. The method of claim 12, wherein the first infrared wavelength is 10.8 um and the second infrared wavelength is 12 um.

17. The method of claim 12, wherein the at least two infrared wavelengths include a third infrared wavelength of 8.7 um, and further comprising:

determining a presence of $SO_2$ gas in the flight path of the aircraft based at least partially on the third infrared wavelength; and providing at least one of an advisory, a caution, and a warning indicative of a presence of volcanic ash in the flight path of the aircraft to the flight crew via the output device.

* * * * *